Dec. 15, 1942.  L. T. WARD  2,305,286
AERATOR AND CHARGING MECHANISM THEREFOR
Filed July 29, 1940  3 Sheets-Sheet 1

INVENTOR.
Lawrence T. Ward,
BY Bair & Freeman
Attys.

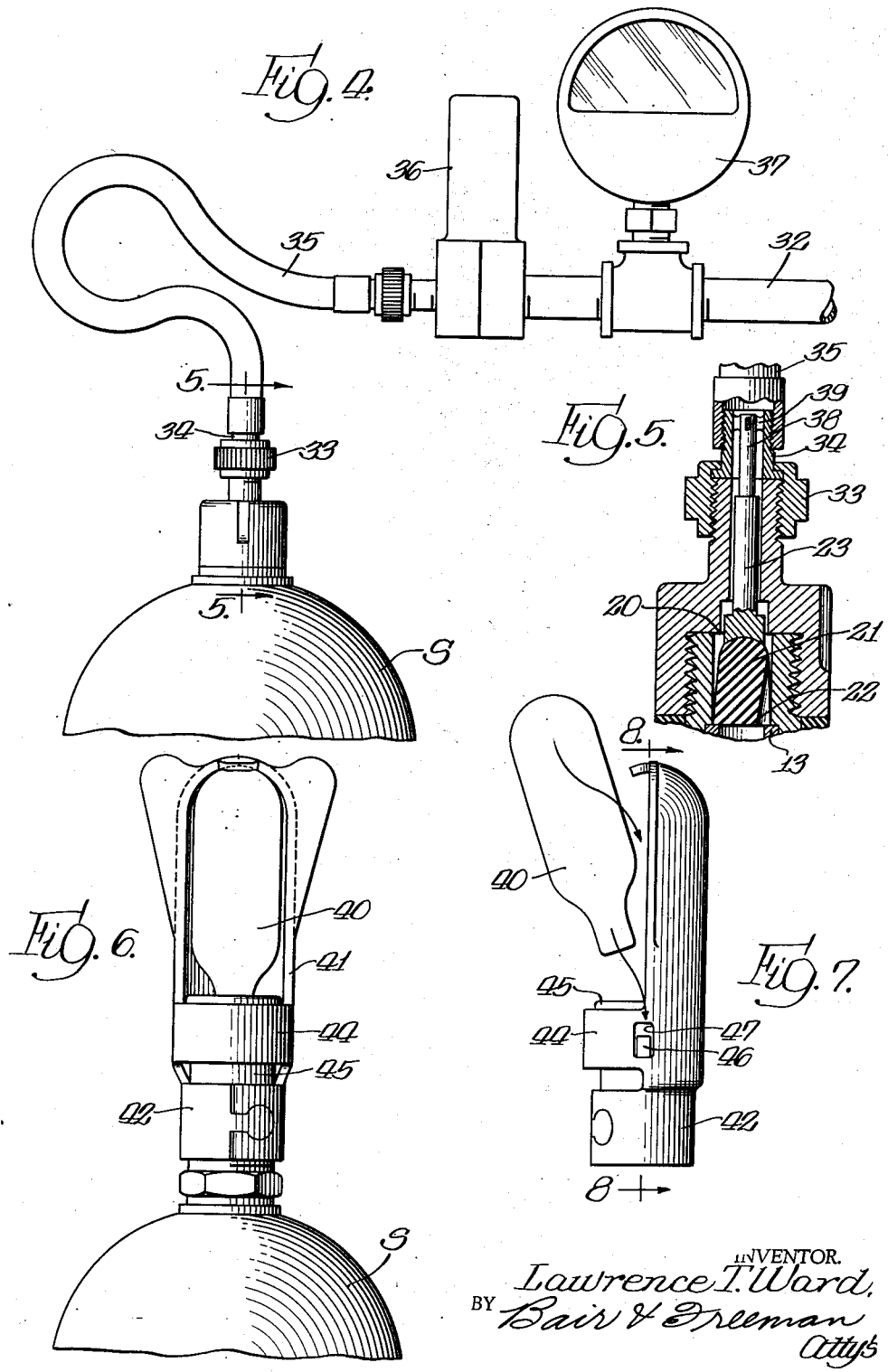

Dec. 15, 1942.  L. T. WARD  2,305,286
AERATOR AND CHARGING MECHANISM THEREFOR
Filed July 29, 1940   3 Sheets-Sheet 3
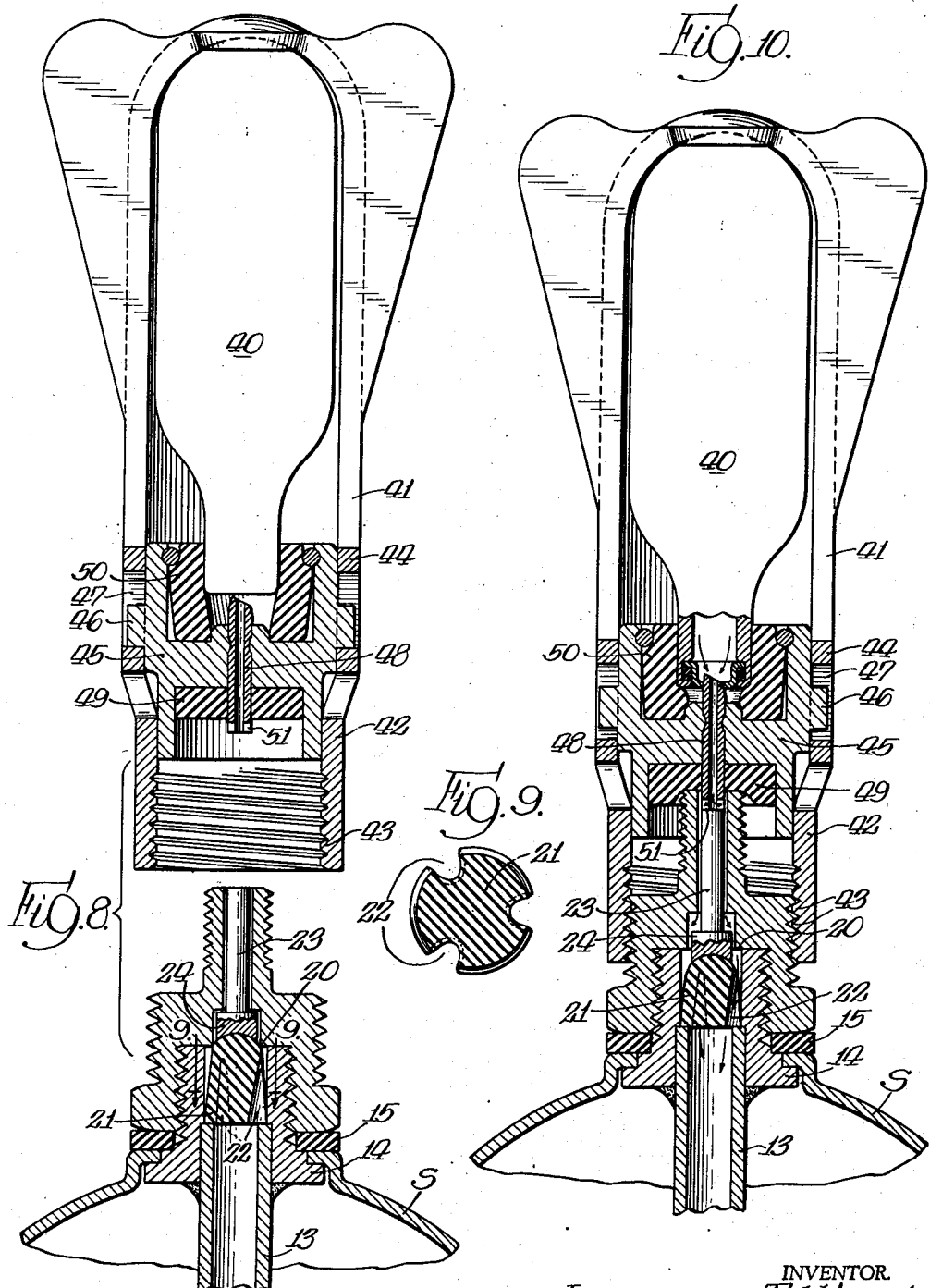
INVENTOR.
Lawrence T. Ward,
BY Bair & Freeman
Attys.

Patented Dec. 15, 1942

2,305,286

UNITED STATES PATENT OFFICE 2,305,286

AERATOR AND CHARGING MECHANISM THEREFOR

Lawrence T. Ward, Philadelphia, Pa., assignor to Knapp-Monarch Company, St. Louis, Mo., a corporation of Missouri Application July 29, 1940, Serial No. 348,240

7 Claims. (Cl. 221—74)

My present invention relates to an aerator or syphon particularly adapted for whipping cream and to a mechanism operable to charge the aerator or syphon with compressed gas or the like.

One object of the invention is to provide an aerator construction particularly designed for ease of cleaning and adapted to contain cream to be aerated, and by the aerating process to cause the cream to assume the consistency of whipped cream with a substantial increase in volume of the cream as it is dispensed from the aerator.

Another object is to provide an aerator or syphon construction having a body shell and a bottom member associated therewith, the shell and bottom member forming an aerator vase, a syphon tube extending from the top of the vase through the bottom of the body shell and serving as a tie rod to assemble the bottom member relative to the body shell.

A further object is to provide a removable dispensing head which may be replaced by a union on the end of a discharge hose of a compressed gas line or by a charging mechanism for charging the aerator from a compressed gas bulb or the like.

Still a further object is to provide a valve in the head of the aerator which normally serves as a check valve and which may be opened by either the dispensing head when it is mounted on the aerator and manually operated; by the union on the compressed gas line; or by the charging mechanism for charging the aerator from a gas bulb.

Another object is to provide a charging mechanism formed of a bulb holder having a piercing pin carried by the bulb holder and operable on one end to open the check valve in the top of the aerator and on its other end to pierce the bulb for permitting entry of gas from the bulb into the aerator, the bulb holder being screw threaded on the aerator so that initially the valve in the aerator is opened, and thereafter the bulb is pierced.

My aerator is particularly adaptable for cream which is usually termed "light table" cream, having a butter fat content of 30 percent or better. When nitrous oxide (N₂O) is introduced into a container of such cream a certain amount of gas is absorbed by the cream when enough gas is introduced to build up an internal pressure of 100 to 150 pounds per square inch. After the cream is completely saturated with the gas the cream tends to expand or become aerated because the nitrous oxide has an affinity for the cream when under pressure. The cream may then be dispensed by utilizing the internal pressure, and the result is much the same as obtained by mechanically whipping the cream. As the cream is released to atmospheric pressure its volume will further expand thereby further enhancing the desirable quality of the cream as a topping for sodas, sundaes, pie and the like.

Although my invention is susceptible of a variety of embodiments it is unnecessary to fully describe and illustrate more than one such embodiment in order to give a full understanding of the invention, both from its structural and functional standpoints. Accordingly, on the accompanying drawings I have illustrated a preferred and desirable embodiment of the invention, said drawings forming a part of this specification, and throughout the views of which like reference characters refer to similar parts.

On my drawings,

Figure 4 is a side elevation showing the aerator being charged from a compressed gas line.

Figure 5 is an enlarged sectional view on the line 5—5 of Figure 4, showing a union connection and its coaction with the dispensing valve.

Figure 6 is a side elevation, showing the aerator being charged from a compressed gas bulb.

Figure 7 is a side elevation at 90 degrees from Figure 6, showing the gas bulb being inserted in a holder therefor.

Figure 8 is an enlarged sectional view on the line 8—8 of Figure 7, showing the bulb and holder separated from the aerator.

Figure 9 is a sectional view on the line 9—9 of Figure 8, showing the dispenser valve plug; and Figure 10 is a sectional view similar to Figure 8, showing the bulb holder associated with the aerator and the compressed gas being transferred from the bulb to the aerator.

Figure 1:
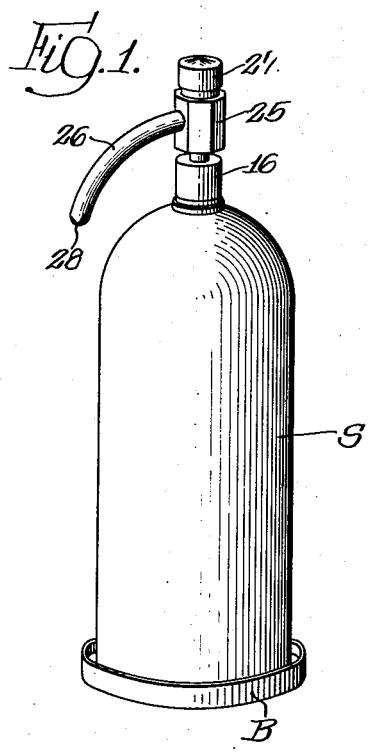
Figure 1 is a perspective view of an aerator or syphon embodying my invention and of a dispensing head mounted thereon.

On the accompanying drawings I have used the reference character S to indicate a shell or body and B a bottom member therefor. The shell S has its lower edge contacting with a gasket 10 mounted in an annular channel 12 of the bottom member B. For holding the parts S and B tightly in contact a syphon tube 13 is provided which serves as a tie rod for the parts. The syphon tube 13 has perforations 13ᵃ adjacent the top of the bottom member B. The syphon tube is welded or brazed into a bushing 14 at its upper end which bushing is positioned against a gasket 15 by a sleeve member 16. The gasket 15 contacts with the outer surface of the shell S at the top thereof, while a flange of the bushing 14 contacts with the inner surface of the shell.

The lower end of the syphon tube and tie rod 13 passes through a perforation 17 of the bottom member B and through a gasket 18. A tie rod nut 19 is tightly screwed on to the syphon tube 13.

The sleeve 16 has a valve seat 20 for a dispensing valve plug 21. The valve plug 21 is formed of rubber or the like with a hemispherical upper end. The valve plug 21 rests on a shoulder formed by the upper end of the syphon tube 13 and is provided with a plurality of grooves 22 (see Figure 9) to permit passage of gas into or from the syphon tube. An actuating pin 23 is loosely mounted in the sleeve 16 and has a head 24 on its lower end provided with a concave seat resting against the valve 21.

A dispensing head is provided for the aerator consisting of a body member 25, a spout 26 and a knob 27. The body member 25 is adapted to be screwed on to the sleeve 16 and the spout 26 has a discharge slot 28. The knob 27 is secured to a stem 29 having a stop shoulder 30 and is normally retained in the raised position of Figure 2 by a spring 31. The knob 27 may be depressed to the position on Figure 3 for unseating the valve 21 from the seat 20 when it is desirable to dispense the contents of the container S, B.

In Figure 4 I illustrate a compressed gas line 32 supplying a suitable gas such as nitrous oxide to the aerator. The dispensing head has been removed and in place of it a union nut 33 has been screwed on to the sleeve 16. The union nut is rotatable on a sleeve fitting 34 connected with a flexible hose 35 to which the gas is supplied by a suitable valve (not shown) ahead of a pressure gauge 37. The gauge 37 is used to indicate the pressure of the gas.

The sleeve 34 carries a stem 38 supported therein by webs 39. The stem 38 is adapted to engage the actuating pin 23 for opening the valve 21 as shown in Figure 5. The flexible hose 35 permits shaking of the container S during the charging operation.

My aerator may be charged from a compressed gas bulb 40 as shown in Figure 10. A holder 41 is provided for the bulb and the bulb may be inserted into the holder as illustrated in Figure 7. The holder 41 has a sleeve portion 42 provided with threads 43 adapted to be screwed on to the fitting 16 at the top of the shell S.

The holder 41 also has a sleeve portion 44 in which is slidably and non-rotatably supported a floating piercing pin support 45. The support 45 has a pair of fingers 46 slidable in slots 47 to provide further slidable and non-rotatable mounting of the support relative to the bulb holder.

A bulb piercing pin 48 is carried by the support 45 and the support has a pair of gasket members 49 and 50. The gasket member 49 is adapted to contact with the upper end of the fitting 16 as shown in Figure 10 to effect a seal at this point, while the gasket 50 is adapted to effect a seal between the support 45 and the neck of the bulb 40. The lower end of the piercing pin 48 is slotted as at 51 to permit passage of gas from the bore of the piercing pin into the fitting 16 when the piercing pin is serving to open the valve 21 as in Figure 10 by engaging the actuator pin 23.

*Practical operation*

Figure 2:
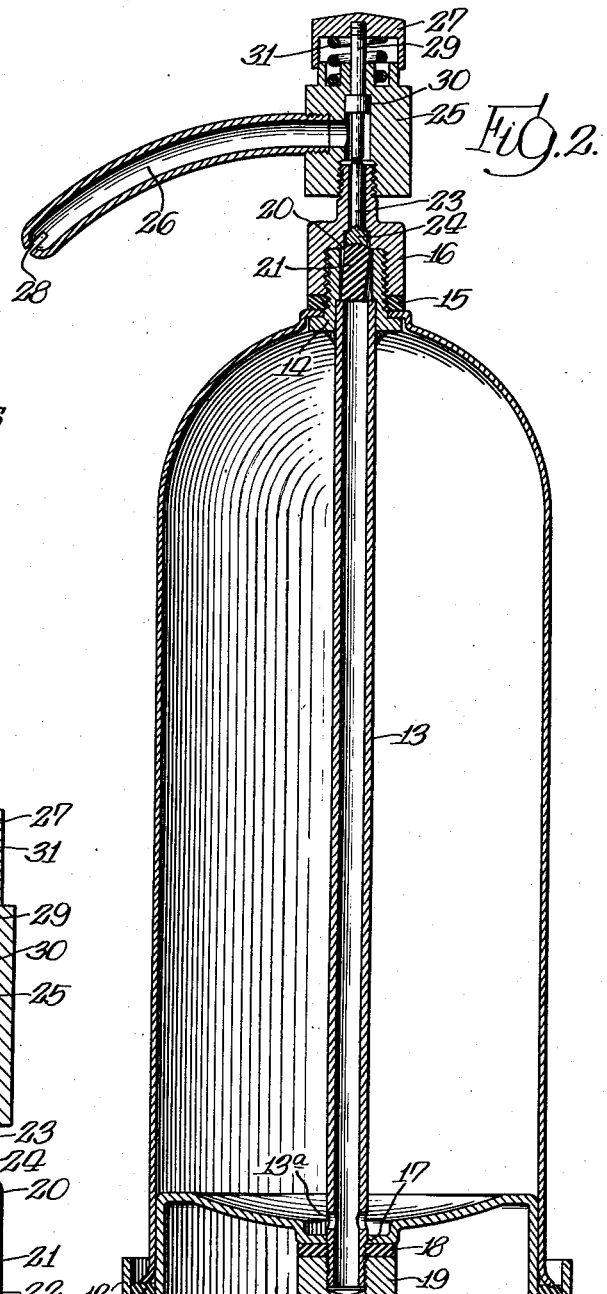
Figure 2 is a vertical, sectional view of Figure 1, showing the parts on an enlarged scale.
Figure 3:
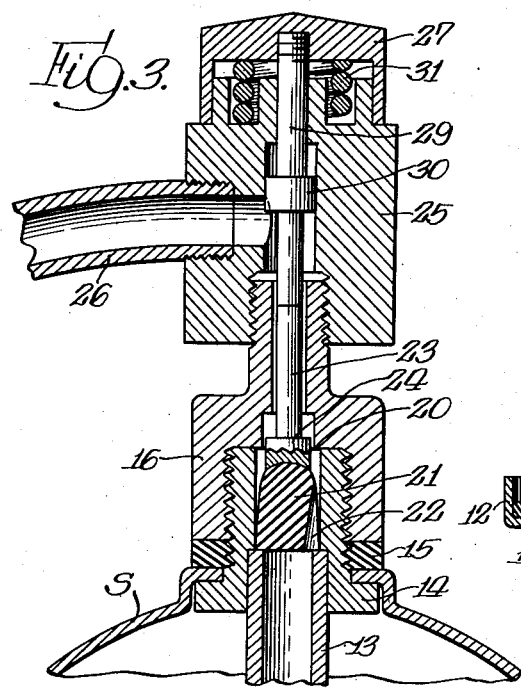
Figure 3 is a further enlarged sectional view of the upper portion of Figure 2, showing a dispensing valve in open position.

In the operation of my aerator, the nut 19 and the bottom member B of Figure 2 may be removed and the shell S inverted whereupon the shell may be filled with cream to the desired level. The bottom member B is then replaced and the nut 19 tightened to effect a seal at the gasket 18. The dispensing head fitting 25 may then be replaced either by the coupling nut 33 or the bulb holder 41. When the coupling nut 33 is used gas may be introduced through the hose 35 and such gas will issue as bubbles from the perforations 13ᵃ. The aerator is vigorously shaken while the gas is being introduced so as to facilitate absorption of the gas by the cream. A safety valve 36 prevents pressure in the shell S from building up to a point where the shell might fail.

When the desired amount of gas has been introduced into the aerator, then gas to the line 32 is shut off and the coupling nut 33 removed. The valve 21 will act as a check valve and close to retain the contents of the aerator. The charged cream may now be distributed from a local filling station to soda fountains, restaurants and the like by a system known as "package trade." The filling station has a pick-up and delivery system which makes daily contact with the various outlets.

If, on the other hand, the aerator is to be filled and charged by the user, the cream filling operation can be performed as above described and then the bulb 40 is used to charge the cream. The bulb 40 is first placed in the holder 41, as shown in Figure 8, after which the holder is screwed into position on the aerator as in Figure 10. After the gasket 49 effects a seal with the upper end of the fitting 16 the piercing pin 48 will actuate the pin 23 to cause it to open the valve 21, following which, the valve 21 will offer sufficient resistance to the actuating pin to cause the support 45 to move upwardly and effect piercing of the discharge end of the bulb 40 by the piercing pin. The gas from the bulb thereupon enters the syphon 13 as indicated by the arrows.

When it is desirable to dispense the cream from the aerator, the dispensing fitting is screwed into position on the fitting 16. The knob 27 may then be depressed for opening the valve 21 and thereby permitting the pressure of the gas on the cream to displace the cream through the perforations 13ᵃ, the syphon tube 13, the fitting 16 and the spout 26. The cream expands and issues as a ribbon from the slot 28 as the spout is moved as desired over the material on which the cream is being deposited.

Some changes may be made in the construction and arrangement of the parts of my aerator without departing from the real spirit and purpose of my invention. Accordingly it is my intention to cover by my claims such modified forms of structure or use of mechanical equivalents as may be reasonably included within my scope.

I claim as my invention:

1. In an aerator, a cylindrical shell open across its entire bottom and having a permanently closed top, a bottom member for said shell, a syphon tube connected with said top of said shell and extending downwardly and through said bottom member, a closure nut on said tube against said bottom member whereby the tube serves as a tie rod to retain said bottom member and said shell in assembled relation to each other, and a dispensing head on said shell and communicating with the upper end of said syphon tube.

2. An aerator comprising a shell having a fixed top, a bottom member for said shell, a syphon tube fixed to said top of said shell and extending freely through said bottom member, a nut on said tube whereby the tube serves as a tie rod for said bottom member with respect to said shell, a dispensing head on said shell and means of communication between said syphon tube and the interior of said shell adjacent said bottom member, and between said syphon tube and said dispensing head.

3. An aerator comprising an open bottom shell, a bottom member therefor, a syphon tube from the top of said shell and extending freely through said bottom member, a nut on said tube whereby the tube may be drawn downwardly through said bottom member to serve as a tie rod to retain said bottom member and said shell in disconnectible assembled relation to each other, a dispensing head on said shell, valve means in said head and means of communication between the interior of said shell, said tube and said valve means.

4. In an aerator, a shell open at its bottom, a separable bottom member therefor, a combined syphon tube and tie rod from the top of said shell through said bottom member, a nut on said tube exterior of said bottom member, a fitting on the top of said syphon tube, said fitting having a valve seat, a valve plug for seating thereagainst, said valve plug being formed entirely of resilient material and being positioned between said syphon tube and said seat, said plug being normally of greater length than the distance between said syphon tube and said seat, an actuating pin in said fitting, and a dispensing head removably positioned on said fitting and including an operating knob coactible with said actuating pin to move it downwardly, said actuating pin coacting with said valve plug to unseat the upper end thereof from said seat by compression of the plug by the pin.

5. In an aerator, a shell, a syphon tube depending into said shell, a dispensing head on the outer end thereof, a valve seat and a valve plug between said tube and head, said valve plug being formed of resilient material and being of greater height than the distance between said seat and tube, an actuating pin, said dispensing head including an actuator for said pin to propel it, thereby causing it to engage and to unseat said valve plug relative to said seat.

6. In an aerator of the character disclosed, a shell, a syphon tube extending thereinto, a dispensing head at the outer end thereof, a fitting for connecting said dispensing head to said syphon tube, said fitting having a valve seat, a valve plug supported for seating thereagainst, and an actuating pin in said fitting means for opening said valve by compressing it through actuation of said actuating pin, said valve plug being of greater length than the distance between its support and said valve seat so that it is normally seated and its seated end moves away from said seat while its opposite end remains stationary when the valve plug is compressed.

7. An aerator comprising a shell, a syphon tube depending into said shell, a fitting on one end of said syphon tube, said fitting having a valve seat, a valve plug for seating thereagainst, said valve plug being formed of resilient material, positioned between said syphon tube and said seat and being of greater length than the distance between said syphon tube and said seat whereby the resiliency of the plug retains it seated, an actuating pin in said fitting, and a dispensing head including an operating means for said actuating pin to control the unseating of said valve plug.

LAWRENCE T. WARD.